United States Patent [19]
Park et al.

[11] Patent Number: 5,825,983
[45] Date of Patent: Oct. 20, 1998

[54] TACTILE FEEDBACK DEVICE FOR REMOTE CONTROL ROBOT USING REPULSIVE FORCE OF MAGNET

[75] Inventors: Jong-Oh Park; Chong Won Lee; In Seok Ahn; Hyo Sik Kang, all of Seoul, Rep. of Korea

[73] Assignee: Korea Institute of Science and Technology, Seoul, Rep. of Korea

[21] Appl. No.: 678,714

[22] Filed: Jul. 11, 1996

[30] Foreign Application Priority Data

Mar. 22, 1996 [KR] Rep. of Korea .................... 1996/7926

[51] Int. Cl.$^6$ ............................... H01F 7/08; B25J 11/00; A63B 21/00
[52] U.S. Cl. ........................... 395/99; 318/680; 318/687; 901/40; 901/29; 335/220; 335/229
[58] Field of Search ............................... 395/99; 318/680, 318/687; 901/40, 29; 335/220, 229

[56] References Cited

U.S. PATENT DOCUMENTS

| | | | |
|---|---|---|---|
| 4,692,678 | 9/1987 | Lee | 318/687 |
| 4,882,836 | 11/1989 | Higuchi | 901/29 |
| 4,891,764 | 1/1990 | McIntosh | 364/508 |
| 5,099,216 | 3/1992 | Pelrine | 335/220 |
| 5,111,140 | 5/1992 | Takahata | 324/228 |
| 5,160,877 | 11/1992 | Fujiwara et al. | 318/687 |
| 5,272,458 | 12/1993 | Hoffman et al. | 335/179 |
| 5,409,435 | 4/1995 | Daniels | 482/5 |
| 5,516,249 | 5/1996 | Brimhall | 414/5 |
| 5,576,605 | 11/1996 | Niyazawa | 318/568.12 |
| 5,631,861 | 5/1997 | Kramer | 364/406 |

OTHER PUBLICATIONS

Sato, et al., "Development of Non–Constrained Master Arm with Tactile Feedback Device", pp. 334–338.

Oomichi et al., Shape Recognition with Tactile and Force Sensing by Using Master Slave 4–Fingered Manipulator, '95, 439–444.

Burdea et al., Dextrous Telerobotics with Force Feedback—An Overview. Part 1: Human Factors, 1991, pp. 171–178.

Burdea et al., Dextrous Telerobotics with Force Feedback—An Overview Part 2: Control and Implementation, 1991, pp. 291–298.

*Primary Examiner*—George B. Davis
*Attorney, Agent, or Firm*—Scully, Scott, Murphy & Presser

[57] ABSTRACT

An improved tactile feedback device for a remote control robot using a repulsive force of a magnet, which is capable of achieving a more accurate operation and productive work of the robot by transmitting the tactile information of a work object positioned between grippers of robot hands to a robot operator in a central control room, which includes a computer for receiving a tactile information and for outputting a tactile feedback signal in accordance with the tactile information; a driving circuit unit for converting a tactile feedback signal outputted from the computer into a current; and a tactile feedback device for transferring a predetermined pressure to an operator in cooperation with a repulsive force between an electromagnet and a permanent magnet when the electromagnet is driven in accordance with a current applied thereto from the tactile feedback device driving unit.

10 Claims, 7 Drawing Sheets

TACTILE FEEDBACK DEVICE FOR REMOTE CONTROL ROBOT USING REPULSIVE FORCE OF MAGNET

BACKGROUND OF THE INVENTION

1. Field of the Invention

The present invention relates to a tactile feedback device for a remote control robot using a repulsive force of a magnet, and particularly to an improved tactile feedback device for a remote control robot using a repulsive force of a magnet which is capable of achieving a more accurate operation and productive work of the robot by transmitting a tactile information of a work object positioned between grippers of robot hands to a robot operator in a central control room.

2. Description of the Conventional Art

In the industry, a conventional remote control robot system is generally used at a dangerous working area, to which human can not easily access for working, such as at a radiation area, a chemically polluted area, a deep sea, and in the space. As shown in FIG. 1, the robot system is controlled by an operator in a central control room. As shown therein, the function of the system is performed based on the control of the operator. Here, so as to more effectively control the robot, the operator uses various information which are inputted to the system from the robot which is remotely positioned from the central control room.

Most of the remote control robot system had been developed by adapting techniques of a camera, a television set, a microphone, and a speaker to have visual sense and hearing sense. However, actually it is difficult to more effectively and accurately control the remote robot using information referred to the above-mentioned visual sense and hearing sense.

As a conventional tactile feedback device which is adapted to the remote control robot system, "the Teletact II" of ARRC/Airmuscle Ltd. and "the Tactools XTT1" of the Xtensory Ltd. have been introduced in the industry.

The Teletact II is directed to using a hydraulic pressure, and is provided with an expandable small air bag so as to transfer pressure to corresponding elements of the system using an electronic controller and a compressor. Here, one tactor has a diameter of 15 mm, and when it is expanded in maximum, the unit area of the contact is 100 mm². Here, only one tactor is attached to each finger of a robot. Each tactor has a maximum output of 8.4 g/mm².

In addition, the Tactools XTT1 is directed to using a shape memory alloy, and includes an on-off type switch which has a feature for continuously controlling the output. Since the size of one tactor is 9×20×5 mm³, only one tactor is attached to each finger of the robot. The tip of each finger is provided with an output signal through a pin, which is attached to each tactor, having a diameter of 1 mm.

However, the tactile feedback device which is necessary for the remote control robot system have to satisfy two conditions below. First, so as to transfer the information generated from the tactile sensor provided at a remote robot gripper to the central control room without changes and loss of the information, the feed-back operation of the tactile feedback device should be performed in an array unit, and second, so as to more effectively feed-back information which has different size and transferred thereto from the tactile sensor, the continuous control with respect to the output of the tactile feedback device should be made.

However, in the conventional tactile feedback device, the above-mentioned conditions can not resolved. Therefore, it is impossible to accurately transfer a tactile information of a work object which is touched by the grippers of the robot arm to the central control room.

SUMMARY OF THE INVENTION

Accordingly, it is an object of the present invention to provide a tactile feedback device for a remote control robot using a repulsive force of a magnet, which overcomes the problems encountered in a conventional tactile feedback device for a remote control robot using a repulsive force of a magnet.

It is another object of the present invention to provide an improved tactile feedback device for a remote control robot using a repulsive force of a magnet, which is capable of achieving a more accurate operation and productive work of the robot by transmitting the tactile information of a work object positioned between grippers of robot hands to a robot operator in a central control room.

To achieve the above objects, there is provided a tactile feedback device for a remote control robot using a repulsive force of a magnet, which includes a computer for receiving a tactile information and for outputting a tactile feedback signal in accordance with the tactile information; a driving circuit unit for converting a tactile feedback signal outputted from the computer into a current; and a tactile feedback device for transferring a predetermined pressure to an operator in cooperation with a repulsive force between an electromagnet and a permanent magnet when the electromagnet is driven in accordance with a current applied thereto from the tactile feedback device driving unit.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
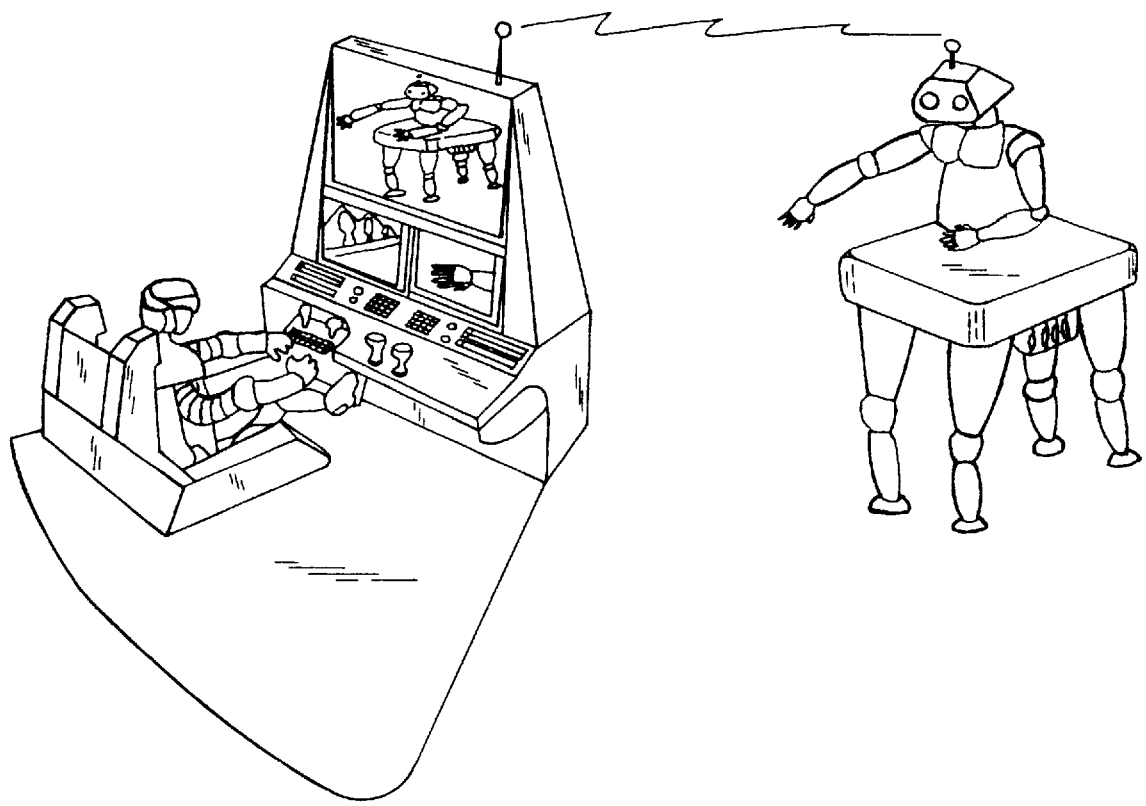
FIG. 1 is a schematic perspective view of a conventional remote control robot system.
Figure 2:
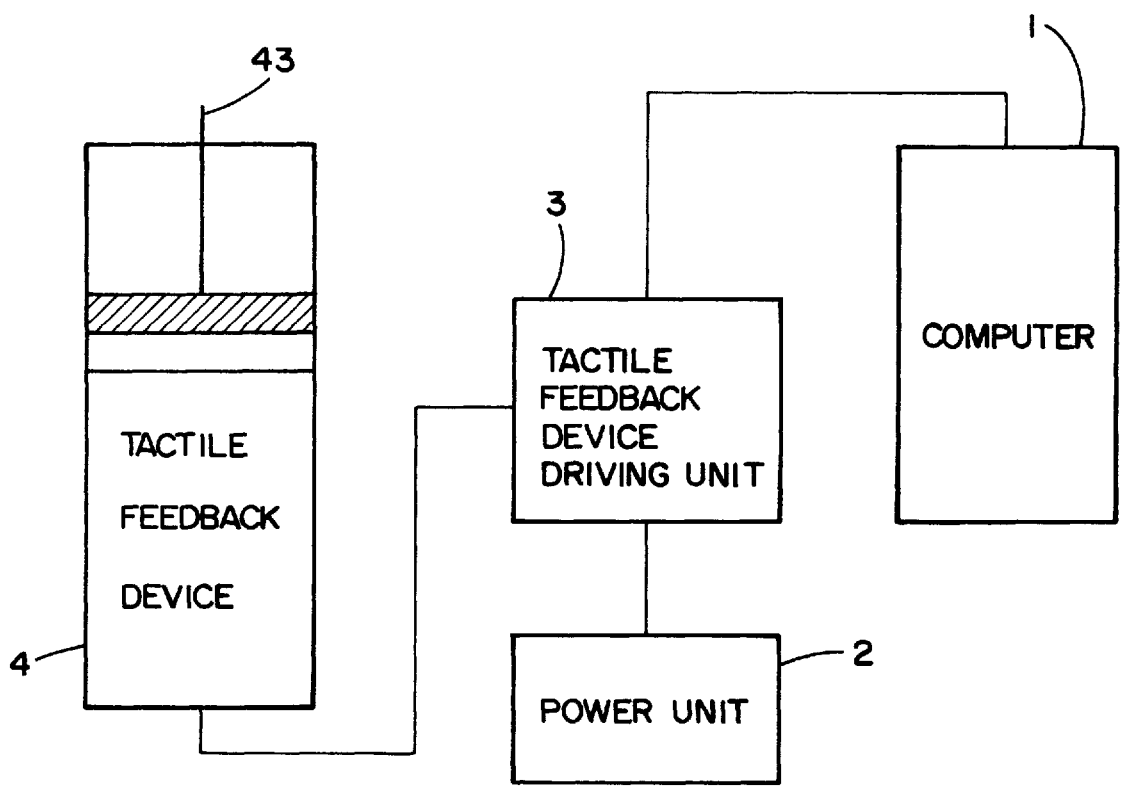
FIG. 2 is a diagram of the construction of a tactile feedback device using a repulsive force of a magnet of the present invention.
Figure 3:
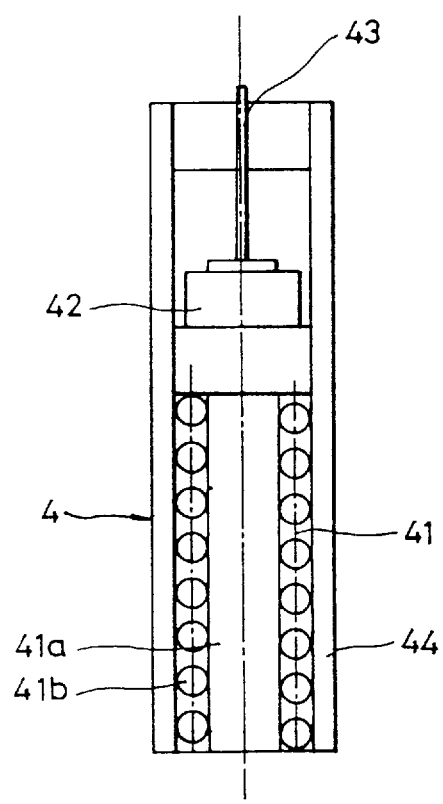
FIG. 3 is a cross-sectional view of the construction of a tactile feedback device of FIG. 2 of the present invention.

FIG. 2 shows the construction of a tactile feedback device using a repulsive force of a magnet, and the construction of a tactile feedback device 4 of the present invention. As shown therein, the tactile feedback device using a repulsive force of a magnet of the present invention includes a tactile feedback device driving unit 3 for receiving power from a power unit 2, converting a tactile feedback signal outputted from a computer 1 into current, and the tactile feedback device 4, which is driven in accordance with a current applied thereto through the tactile feedback device 4, for transferring a predetermined pressure to an operator through a pin 43 in cooperation with a repulsive force generated between an electromagnet 41 and a permanent magnet 42 as shown in FIG. 3. The tactile feedback device 4 includes the electromagnet 41 having a core 41a and a coil 41b provided in an inner lower portion of a guide 44, the permanent magnet 42 disposed at the upper portion of the electromagnet 41 and which is upwardly movable within the guide 44 in cooperation with a repulsive force generated between the electromagnet 41 and the permanent magnet 42, and the pin 43 provided at the upper portion of the permanent magnet 42. With the above-mentioned construction, a repulsive force is generated between the electromagnet 41 and the permanent magnet 42 upon providing a direct current to the electromagnet 41 so as to generate the same polarity between the lower surface of the permanent magnet 42 and the upper surface of the electromagnet 41. Here, the repulsive force enables the pin 43 to move upwardly.

The repulsive force generated between the electromagnet 41 and the permanent magnet 42 is modeled in a stress tenser method of Maxwell. The modeling will now be explained.

Assuming that the magnetic strength of the electromagnet 41 is $m_e$, the magnetic strength of the permanent magnet 42 is $m_p$, the force F between the magnetic force $m_e$ and the magnetic strength $m_p$ can be expressed as follows.

$$F = \frac{m_e m_p}{4\pi\mu_o x^2} \tag{1}$$

where $\mu_o$ denotes a vacuum permeability, and x denotes the distance between the electromagnet 41 and the permanent magnet 42.

Meanwhile, the force between the electromagnet 41 and the permanent magnet 42 can be expressed as follows. That is, there exist two kinds of forces: a repulsive force and a suction force.

$$\alpha \left( \frac{1}{x^2} - \frac{1}{(x+L_e)^2} - \frac{1}{(x+L_p)^2} - \frac{1}{(x+L_e+L_p)^2} \right) \tag{2}$$

where $L_e$ denotes the length of a core of the electromagnet 41, $L_p$ denotes the length of the permanent magnet 42.

However, since $L_e > L_p$, $L_e > x$, the second term and the fourth term of the expression 2 are not considered. That is, the upper polarity of the electromagnet 41 and both polarities of the permanent magnet 42 are considered.

$$\alpha \left( \frac{1}{x^2} - \frac{1}{(x+L_p)^2} \right) \tag{3}$$

In addition, since the electromagnet 41 does not have a repulsive force at an initial stage, only a state after the electromagnet 41 is magnetized is considered in the present invention.

Therefore, as described above, the tactile feedback device is directed to a one-directional modelling, and only one polarity of the electromagnet 41 and both polarities of the permanent magnet 42 are considered. In addition, assuming that the electromagnet 41 is magnetized, the modelling of the tactile feedback device of the present invention can be made.

As a result, the force of the tactile feedback device 4 is generated between the electromagnet 41 and the permanent magnet 42, and the magnetic repulsive force $F_m$ is expressed as follows.

$$F_m = \frac{m_e m_p}{4\pi\mu_o x^2} - \frac{m_e m_p}{4\pi\mu_o (x+L_p)^2} \tag{4}$$

Meanwhile, the magnetic strength $F_e$ of the electromagnet 41 is referred to a multiplication between the surface magnetic field density $B_e$ and the surface $S_e$ which can be expressed as follows.

$$m_e = B_e S_e = B_e \pi a^2_e \tag{5}$$

where $a_e$ denotes a radius of the electromagnet 41.

In addition, since the magnetic polarity of the surface magnetic field density $B_e$ is referred to $Z = L_e$, it can be expressed as follows.

$$B_e = \frac{\mu NI}{2L_e} \left\{ \frac{L_e}{\sqrt{L_e^2 + a_e^2}} \right\} \tag{6}$$

where $\mu$ denotes a magnetic permeability of the core 41a of the electromagnet 41, N denotes the number of windings per unit length of the electromagnet 41, and I denotes current of the coil 41b of the electromagnet 41.

Therefore, the magnetic strength of the electromagnet 41 can be obtained as follows by inserting the expression (6) into the expression (5).

$$m_e = \frac{\mu \pi a_n^2 n I L_e}{2\sqrt{L_e^2 + a_e^2}} \tag{7}$$

In addition, the magnetic strength $m_p$ of the permanent magnet 42 is referred to the multiplication between the surface magnetic field density $B_p$ and the surface $S_p$ which can be expressed as follows.

$$m_p = B_p S_p = B_p \pi a^2_p \tag{8}$$

where $a_p$ denotes a radius of the permanent magnet 42.

Therefore, the magnetic repulsive force $F_m$ can be expressed as follows by inserting the expressions (7) and (8) into the expression (4).

$$F_m = \frac{\mu \pi B_p a_e^2 a_p^2 n I L_e}{8\mu_o \sqrt{L_e^2 + a_e^2 x^2}} - \frac{\mu \pi B_p a_e^2 a_p^2 n I L_e}{8\mu_o \sqrt{L_e^2 + a_e^2 (x+L_p)^2}} = \frac{\mu \pi B_p a_e^2 a_p^2 n I L_e}{8\mu_o \sqrt{L_e^2 + a_e^2}} \left( \frac{1}{x^2} - \frac{1}{(x+L_p)^2} \right) \tag{9}$$

here, assuming that $$\frac{\mu \pi B_p a_e^2 a_p^2 n I L_e}{8\mu_o \sqrt{L_e^2 + a_e^2}}$$

is $\alpha$, the magnetic repulsive force $F_m$ can be expressed as follows:

$$F_m = \alpha \left( \frac{1}{x^2} - \frac{1}{(x+L_p)^2} \right) I \tag{10}$$

As is seen in the above-mentioned expressions, the remaining values except for the current I which is applied from the tactile feedback device driving unit 3 are constant values such as a design variation reference or based on a result of the experiment.

Figure 4:
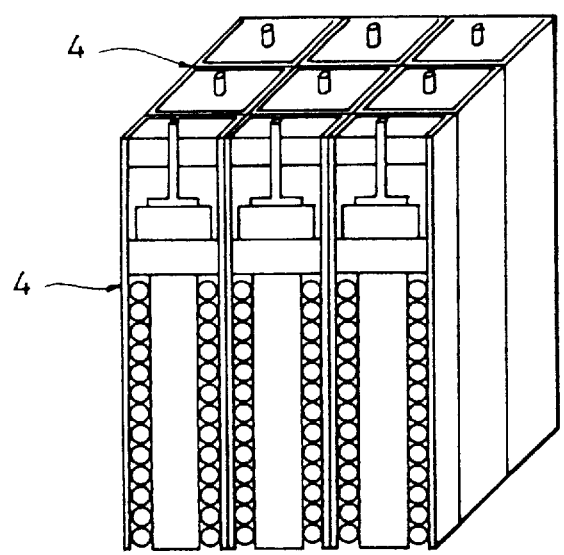
FIG. 4 is a perspective view of a 3×3 array of a tactile feedback device of FIG. 3 of the present invention.

FIG. 4 shows the construction of the tactile feedback device 4 which is provided in a 3×3 array.

Figure 5:
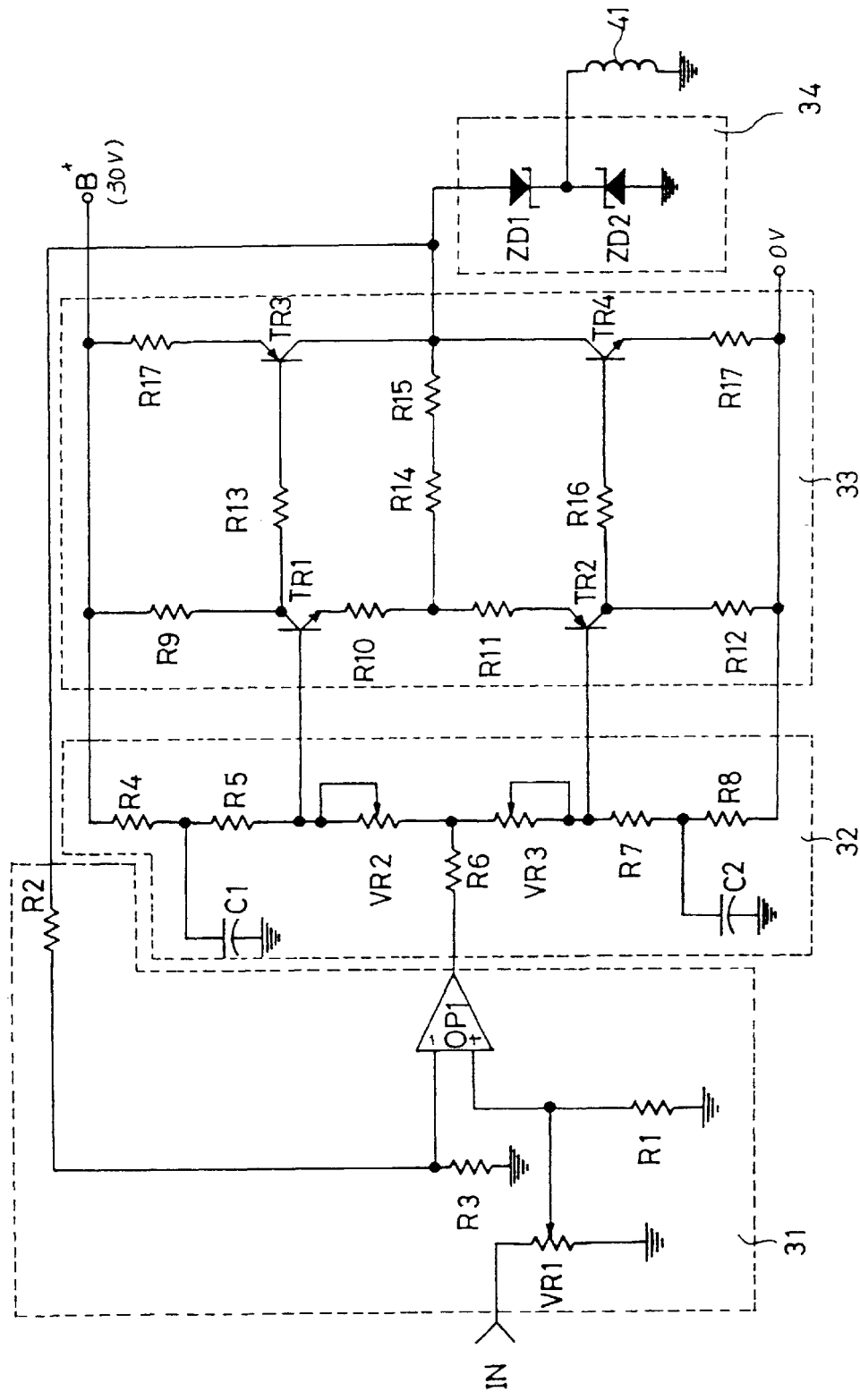
FIG. 5 is a circuit diagram of a tactile feedback device driving device unit of FIG. 2 of the present invention.

FIG. 5 shows the tactile feedback device driving unit 3 of the present invention. As shown therein, the tactile feedback device driving unit 3 includes a comparing unit 31 for comparing a tactile feed-back signal IN outputted from the computer 1 in accordance with a tactile information with a feedback signal in accordance with a driving current applied thereto from the coil 41b of the electromagnet 41 of the tactile feedback device 4, a signal stabilizing unit 32 for filtering and stabilizing an output signal of the comparing unit 31, an amplifier 33 for amplifying the output signal of the signal stabilizing unit 32 and for supplying the signal as a driving current of the coil 41b of the electromagnet 41, and a rectifying unit 34 for rectifying the current supplied to the amplifier 33 and driving the coil 41b of the electromagnet 41.

The comparing unit 31 is constructed so that a tactile feedback input signal IN can be applied to the resistor R1, of which one end is connected to ground, and a non-inverter input terminal (+) of the operation amplifier OP1 through the current limited variable resistor VR1. In addition, the output signal of the amplifier 33 which is inputted to the rectifying unit 34 is applied to the inverting input terminal (−) of the operation amplifier OP1.

The signal stabilizing unit 32 is constructed so that the direct current voltage B⁻ of 30v is applied to the condenser C1 through the resistor R4, and the connection point is connected to the condenser C2 and the resistor R8 through the resistor R5, the variable resistors Vr2 and Vr3, and the resistor R7. The output terminal of the operation amplifier OP1 is connected to the connection point of the variable resistors VR2 and VR3 through the resistor R6. In the amplifier 33, the connection point between the resistor R5 and the variable resistor VR2 and the connection point between the variable resistor VR3 and the resistor R7 are connected to the base of the transistors TR1 and TR2, respectively. In addition, the power voltage B⁺is applied to the emitter of the transistor TR3 through the resistor R17, and applied to the collector of the transistor TR1 through the resistor R9, and the connection point is connected to the base of the transistor TR3 through the resistor R13. The emitter of the transistor TR1 is connected to the emitter of the transistor TR2 through the resistors R10 and R11. The collector is connected to the resistor R12 and is connected to the base of the transistor TR4 through the resistor R16, The resistor R17 is connected to the emitter of the transistor TR4. The connection point between the resistors R10 and R11 is commonly connected to the collector of the transistor TR3 through the resistors R14 and R15 and the collector of the transistor TR4. A driving current of the coil 41b of the electromagnet 41 is outputted at the connection point. In addition, the rectifying unit 34 rectifies the driving current, which is outputted from the amplifier 33, in cooperation with the zenor diode ZD1 and the zenor diode ZD2 of which one end is connected to the ground and then supplies the current to the coil 41b of the electromagnet 41.

The operation and effects of the present invention will now be explained with reference to the accompanying drawings.

The computer 1 receives a feed-backing tactile information from a remote robot and outputs a tactile feedback information in accordance with a tactile information. The tactile feedback information outputted therefrom is inputted to the comparing unit 31 of the tactile feedback device driving unit 3, and is compared with a feed-backing input signal of the amplifier 33.

The tactile feedback input signal IN is divided by the current-limited variable resistor VR1 and the resistor R1 of which one end is connected to ground and is applied to the non-inverting input terminal (+) of the operation amplifier OP1. The signal outputted from the amplifier 33 and inputted to the rectifying unit 34 is divided by the resistor R2 and the resistor R3 of which one end is connected to ground, and is applied to the inverting input terminal (−) of the operation amplifier OP1. Therefore, the operation amplifier OP1 outputs a high level voltage when the signal applied to the non-inverting input terminal (+) is higher than the signal applied to the inverting input terminal (−), and the operation amplifier OP1 outputs a low level signal when the signal applied to the non-inverting input terminal (+) is lower than the signal applied to the inverting input terminal (−).

The signal outputted from the comparing unit 31 is filtered and stabilized. Here, the condensers C1 and C2 of the signal stabilizing unit 32 are directed to preventing an oscillating operation of the transistors TR1 and TR2 of the amplifier 33, and the resistors R5 and R7 are directed to controlling the base current of the transistors TR1 and TR2. The variable resistors VR2 and VR3 are directed to constantly maintaining voltage between the base and emitter of the transistors TR1 and TR2. Therefore, the signal outputted from the comparing unit 31 is stabilized by the signal stabilizing unit 32, and then is amplified by the transistors TR1 through TR4 of the amplifier 33, and then is applied to the rectifying unit 34.

That is, in a state that a high level voltage is outputted from the comparing unit 31, the transistors TR1 and TR3 of the amplifier 33 become conductive, and the transistors TR2 and TR4 are disconnected, and a high level signal is outputted. In addition, in a state that a low level signal is outputted from the comparing unit 31, the transistors TR1 and TR3 of the amplifier 33 are disconnected, and the transistors TR2 and TR4 become conductive, and then a low level signal is outputted.

As described above, when the high level signal is outputted from the amplifier 33, the high level signal is rectified by the zenor diodes ZD1 and ZD2 of the rectifying unit 34, and enables a driving current to be applied to the coil 41b of the electromagnet 41. The electromagnet 41 is driven thereby and generates a magnetic force. Since a repulsive force occurs between the electromagnet 41 and the permanent magnet 42, the pin 43 moves upwardly in cooperation with the repulsive force, and a predetermined pressure is applied to the upper portion.

As a result, since a driving current is generated by the tactile feedback device driving unit 3 and is applied to the tactile feedback device 4 in accordance with a tactile feedback signal which is inputted to and inputted from the computer 1, a repulsive force is generated between the electromagnet 41 and the permanent magnet 42 in proportion to the driving current, and then the pin 43 moves upwardly in cooperation with the repulsive force, so that a predetermined pressure is applied to the upper portion.

Meanwhile, when the rectifying unit 34 is made in a form of bridge, it is possible to obtain a higher driving current.

Figure 6:
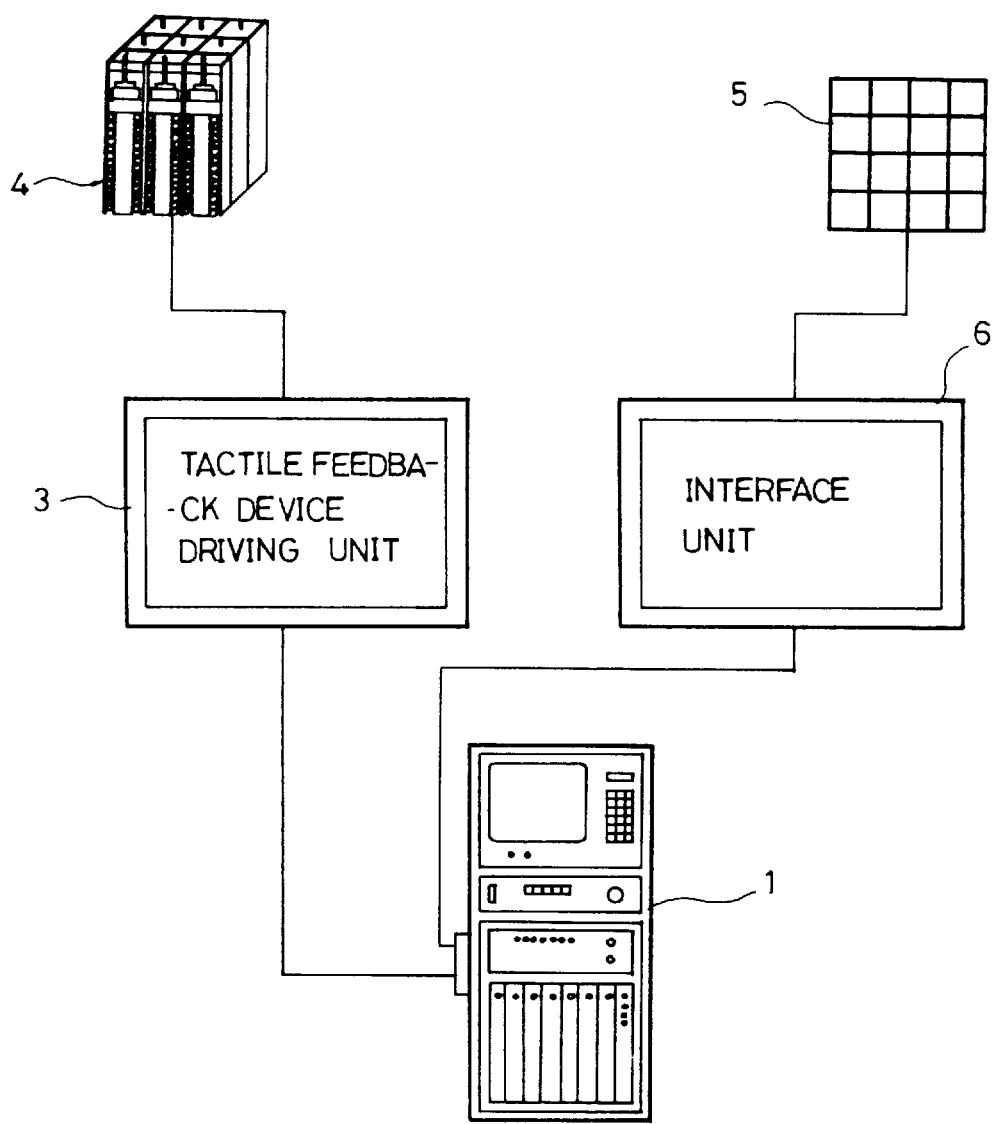
FIG. 6 is a view of the construction of a tactile feedback device of the present invention.

FIG. 6 shows the construction of a tactile feedback device of the present invention, which includes a tactile sensor 5 disposed in an interior of the remote robot for measuring a tactile force of the work object with which grippers of the robot contacts during work of the robot, an interface unit 6 for amplifying the signal detected by the tactile sensor 5 and for performing a multiplexing operation, the computer 1 for receiving the signal multiplexed by the interface unit 6 and for outputting the tactile feedback signal, a tactile feedback device driving unit 3 for receiving a tactile feedback signal outputted from the computer 1 and for converting the signal into an electromagnet driving current, and the tactile feedback device 4, which is driven in accordance with an electromagnet driving current applied thereto from the tactile feedback device driving unit 3, while transferring a certain pressure to the operator.

Figure 7:
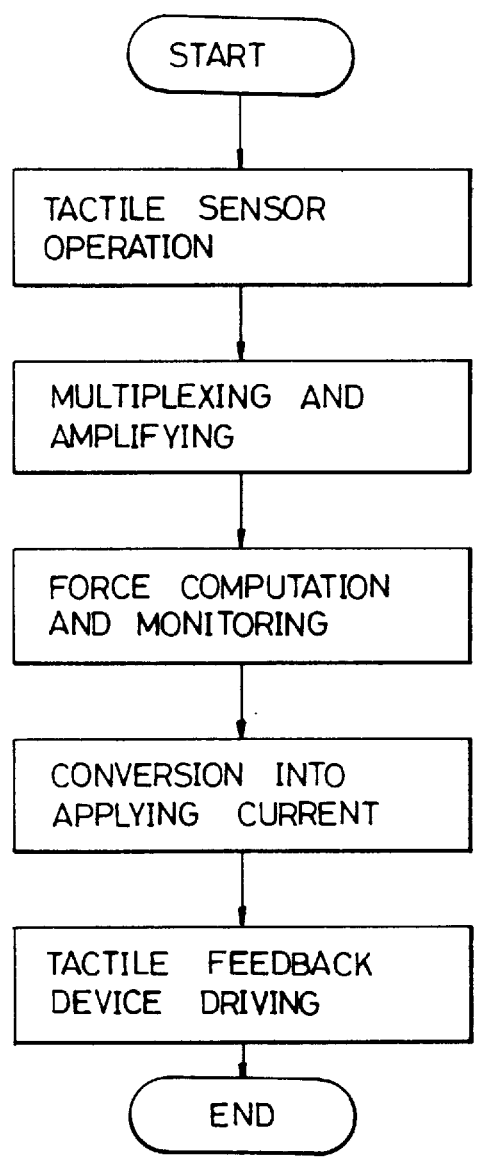
FIG. 7 is a flow chart so as to show an operation control process of FIG. 6 of the present invention.

FIG. 7 shows a flow chart of an operation control process of FIG. 6 of the present invention.

The operation control process will now be explained with reference to FIG. 7.

The tactile sensor 5 disposed at the inner side of each griper of the remote robot is driven in cooperation with the tactile force between grippers when a certain work object is placed between the grippers, and a measuring signal in accordance with the operation is inputted and amplified to the interface unit 6, and then the multiplexed signal is inputted to the computer 1. Therefore, the computer converts the tactile information signal outputted from the interface unit 6 into a digital signal, and computes a force in a form of digital signal. Thereafter, a distribution of the thulsy computed force can be visibly check by the operator. In addition, the computer 1 converts the computed force into an analog signal form and outputs as a tactile feedback signal. The tactile feedback device driving unit 3 is applied with the tactile feedback signal and outputs as a driving current of a corresponding electromagnet. Therefore, the electromagnet 41 of the tactile feedback device 4, which receives a driving force of the electromagnet, is driven. A repulsive force is generated between the electromagnet 41 and the permanent magnet 42. The pin 43 attached to the upper surface of the permanent magnet 42 moves upwardly in cooperation with the repulsive force, and then the operator is applied with a certain force when the force is applied to the tactile feedback device 4. That is, a predetermined force corresponding to the tactile of the tactile sensor 5 is applied to the operator who touches hands on the tactile feedback device 4.

As described above, the tactile feedback device for a remote control robot using a repulsive force of magnets is directed to generating a repulsive force, which is proportional to a driving current, between the electromagnet and the permanent magnet by applying a driving current to the electromagnet of a tactile feedback device in accordance with a tactile information feedbacked thereto from the tactile sensor and transferring the force to the operator, so that a remote robot can be more effectively and accurately controlled. In addition, since the tactile feedback device is formed in a 3×3 array, and a tactile information is feedbacked in an array unit, it is possible to control a continuous output.

Although the preferred embodiments of the present invention have been disclosed for illustrative purposes, those skilled in the art will appreciate that various modifications, additions and substitutions are possible, without departing from the scope and spirit of the invention as described in the accompanying claims.

What is claimed is:

1. A tactile feedback device for a remote control robot using a repulsive force of a magnet, comprising:

a computer for receiving a tactile information and for outputting a tactile feedback signal in accordance with the tactile information;

a driving unit for converting a tactile feedback signal outputted from the computer into a current; and a tactile feedback device for transferring a predetermined pressure to an operator in cooperation with a repulsive force between an electromagnet and a permanent magnet when the electromagnet is driven in accordance with the current applied thereto from the driving unit.

2. The device of claim 1, wherein said tactile feedback device includes:

an electromagnet fixed at an inner lower of a guide and driven in accordance with the current applied thereto from the driving unit for generating a magnetic force;

a permanent magnet disposed at an upper portion of the electromagnet and upwardly movable in cooperation with a repulsive force of the electromagnet within the interior of the guide; and a pin disposed at the upper surface of the permanent magnet for transferring a predetermined pressure to the operator.

3. The device of claim 1, wherein said tactile feedback device is constructed in a form of array.

4. The device of claim 1, wherein said driving unit includes:

a comparing unit for receiving a tactile feedback signal outputted from the computer and for comparing the received signal with a feedback signal in accordance with a driving current applied to the electromagnet of the tactile feedback device;

a signal stabilizing unit for filtering and stabilizing the output signal of the comparing unit;

an amplifier for amplifying the output signal of the signal stabilizing unit and for supplying to the tactile feedback device as a driving current; and a rectifying unit for rectifying the current applied thereto from the amplifier and for driving the electromagnet of the tactile feedback device.

5. The device of claim 4, wherein said comparing unit is constructed to permit a tactile feedback input signal to be applied to non-invertible terminals of a first resistor and an operation amplifier through a first variable resistor, and an output signal of the amplifier to be applied to non-invertible terminals of a third resistor and the operation amplifier through a second resistor.

6. The device of claim 4, wherein said signal stabilizing unit is constructed to permit a power voltage to be supplied to a first condenser through a fourth resistor, thus connecting the contact point between the first condenser and the fourth resistor to a second condenser and an eighth resistor through a fifth resistor, second and third variable resistors and a seventh resistor, and an output signal of the comparing unit to be applied to the contact point between the second and third variable resistors through a sixth resistor.

7. The device of claim 6, wherein said amplifier includes:

first and second transistors which are connected to each other in series through resistors and turned on/off in accordance with a signal of a contact point between the fifth resistor and the second variable resistor and a signal of a contact point between the third variable resistor and the seventh resistor; and third transistor and fourth transistor which are connected to each other in series and turned on/off in accordance with the on/off operation of the first and second transistors for supplying a driving current of the tactile feedback device through the contract point.

8. The device of claim 4, wherein said rectifying unit includes a half-wave rectifying unit by a zenor diode.

9. The device of claim 4, wherein said rectifying unit is arranged in a form of bridge.

10. The tactile feedback device for a remote control robot using a repulsive force of a magnet of claim 1 further including:

a tactile sensor for measuring a tactile force between portions of a work object to which grippers contact; and an interface unit for amplifying the measured signal of the tactile sensor and multiplexing the signal to the computer.

* * * * *

UNITED STATES PATENT AND TRADEMARK OFFICE
CERTIFICATE OF CORRECTION

PATENT NO. : 5,825,983
DATED : October 20, 1998
INVENTOR(S) : Jong-Oh Park, et al.

It is certified that error appears in the above-identified patent and that said Letters Patent are hereby corrected as shown below:

On The Title Page, [56] References Cited, OTHER PUBLICATIONS:

After "Device", Insert --1991--

Column 8, Line 12, Claim 4: "a" should read --the--

Signed and Sealed this

Seventeenth Day of April, 2001

*Attest:*

NICHOLAS P. GODICI

*Attesting Officer*   Acting Director of the United States Patent and Trademark Office